United States Patent [19]

Sakamoto et al.

[11] 4,431,600
[45] Feb. 14, 1984

[54] EXTRUSION MOLDING OF POLYAMIDOIMIDE RESINS

[75] Inventors: Kunisuke Sakamoto, Kamakura; Junichi Yoshimura; Isamu Shiga, both of Yokohama, all of Japan

[73] Assignee: Mitsubishi Chemical Industries Limited, Tokyo, Japan

[21] Appl. No.: 340,665

[22] Filed: Jan. 19, 1982

[30] Foreign Application Priority Data

Aug. 5, 1981 [JP] Japan .................................. 56-122632

[51] Int. Cl.³ .............................................. B29F 3/00
[52] U.S. Cl. ............................ 264/176 R; 264/331.12; 264/331.19; 528/188
[58] Field of Search ...................... 264/68, 126, 176 R, 264/331.19, 331.12; 528/188

[56] References Cited

U.S. PATENT DOCUMENTS

| | | | |
|---|---|---|---|
| 2,350,851 | 6/1944 | Wehr | 264/331.19 |
| 3,676,544 | 7/1972 | Reinking et al. | 264/331.19 |
| 3,714,131 | 1/1973 | Hoback et al. | 528/188 |
| 4,012,478 | 3/1977 | Horikawa et al. | 264/176 R |
| 4,051,212 | 9/1977 | Grigat et al. | 264/176 R |
| 4,238,538 | 12/1980 | Manwiller | 264/331.19 |

FOREIGN PATENT DOCUMENTS 54-23661  1/1979  Japan .

*Primary Examiner*—Donald E. Czaja
*Assistant Examiner*—W. Thompson
*Attorney, Agent, or Firm*—Sughrue, Mion, Zinn, Macpeak, and Seas

[57] ABSTRACT

A process for extrusion molding a polyamidoimide resin comprising: feeding a polyamidoimide molding material in a granular solid or powder form into an extruder; then simultaneously compressing and melting the polyamidoimide molding material under a pressure of about 300 kg/cm² or more by heating it to a temperature between the melting point and the decomposition temperature of the polyamidoimide resin; and next introducing the molten polyamidoimide molding material into a die such that the molten material is shaped to a desired form, solidified in the die, and is extruded from the die in a solidified form.

4 Claims, 3 Drawing Figures

EXTRUSION MOLDING OF POLYAMIDOIMIDE RESINS

FIELD OF THE INVENTION

The present invention relates to a process for the extrusion molding of polyamidoimide resins.

BACKGROUND OF THE INVENTION

Polyamidoimide resins exhibit excellent heat stability, since they contain a combination of an aromatic nucleus and an imido bond. Furthermore, they exhibit excellent toughness because of the high flexibility thereof, which is believed to be attributable to the amido bond. In addition, they have excellent chemical resistance, abrasion resistance, and so forth. Thus, they are very useful engineering plastics.

These polyamidoimide resins are usually molded into various molds or articles by injection molding. However, extruded articles such as continuous bars and pipes, and articles having variable cross sections have not yet been produced from the polyamidoimide resins. This is due to the fact that the polyamidoimide resins cannot be satisfactorily extruded by conventional extrusion molding processes, and even if they could be molded, the molded articles obtained would have only a relatively low density and poor surface characteristics, e.g., appearance.

SUMMARY OF THE INVENTION

The principal object of the invention is to provide a process for the extrusion molding of polyamidoimide resins which permits the continuous lengthwise production of bars and pipes, and molded articles having different cross sections, having a high density and a good surface state, from the polyamidoimide resins.

The present invention, therefore, relates to a process for the extrusion molding of polyamidoimide resins, comprising:

(1) feeding a polyamidoimide molding material in a granular solid or powder form into an extruder;

(2) compressing the polyamidoimide molding material under a pressure of about 300 kg/cm² or more in the extruder and simultaneously melting the material by heating it to a temperature ranging between the melting temperature and the decomposition temperature of the polyamidoimide resin; and (3) introducing the molten polyamidoimide molding material maintained at the same temperature and pressure into a die and extruding therefrom such that the molten material is shaped to a desired form and solidified in the die, and is extruded therefrom in solidified form.

DETAILED DESCRIPTION OF THE INVENTION

Figure 1:
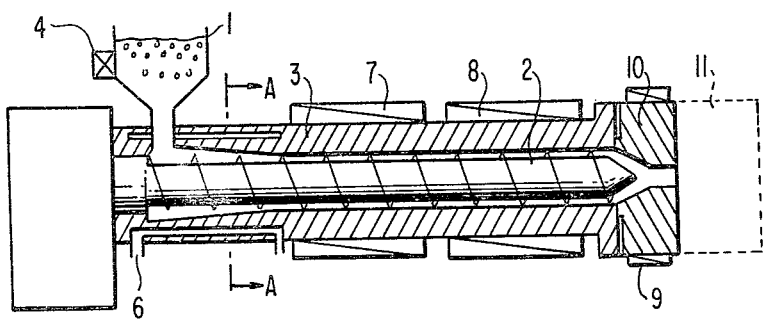
FIG. 1 is a schematic vertical-sectional side view of an apparatus for use in the practice of the process of the invention.

Polyamidoimide resins as used herein are a synthetic resin containing imido and amido bonds in the repeating units of the main chain, and are commercially available. Preferably, a major proportion (based on a weight basis, e.g., about 50 wt% or more) of the polyamidoimide resins has a repeating unit represented by the formula

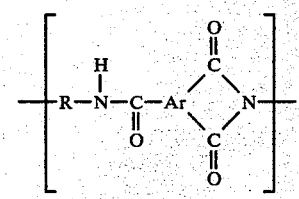

wherein Ar is a trivalent aromatic group containing therein at least one benzene ring, and R is a divalent organic group.

In the above formula, examples of the organic groups include an aromatic group and an aliphatic group. For example, the reaction between trimellitic acid and 4,4'-diaminodiphenyl ether results in the formation of a polyamidoimide resin represented by the formula

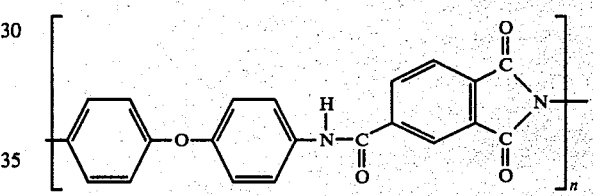

wherein n is typically from 5 to 200.

To these polyamidoimide resins there can be added, if desired, various fillers, additives, etc., to prepare molding materials. The molding material is suitably used in a granular solid form, for example, in the form of pellets or granules.

The molding material is fed into an extruder and heat-melted therein. The extruder for use in the process of the invention is required to meet the requirements as described hereinbelow, which are different from those required for the extrusion of general thermoplastic resins.

The first requirement relates to the extrusion pressure. The polyamidoimide resin as used herein undergoes a polymerization reaction during heat-melting, forming water, and this results in the formation of bubbles in the polyamidoimide resin. In order to prevent this phenomenon and to obtain molded articles containing no such bubbles, it is necessary to use a very high pressure extrusion. For this purpose, it is necessary in this invention that the extrusion pressure be about 300 kg/cm² or more, preferably from 400 to 1,200 kg/cm² and most preferably from 450 to 600 kg/cm².

The second requirement relates to the residence time in the extruder. For the same reasons as for the first requirement, it is necessary in the invention that the residence time is shortened as much as possible. The residence time is generally within about 30 minutes, preferably within about 20 minutes.

Any extruder can be used in the invention as long as it is capable of meeting the above requirements. For example, the apparatus disclosed in Japanese Patent Application (OPI) No. 23661/79 (the term "OPI" as used herein refers to a "published unexamined Japanese patent application") can be employed. It is sufficient provided that the extruder produces an extrusion pressure as 300 kg/cm² or more in the back zone thereof wherein the molding material is transferred thereto.

The above-described requirements can be met, e.g., by the application of the following means (1) to (3):

(1) A cylinder of a screw extruder is provided with grooves in the back zone, i.e., solid transportation zone, over a length of 4D to 6D (i.e., 4 to 6 times the inner diameter of the cylinder) from below a hopper. The grooves are provided in the cylinder usually in a straight or spiral form (parallel to each other) in the extrusion direction. The size of the groove is typically from 1 to 60%, and preferably from 15 to 40%, of the circumferential area of the cylinder. The depth of the groove is usually 1 to 6 mm and preferably 2 to 4 mm, and the groove is designed so that the depth thereof is largest below the hopper.

The provision of such grooves in the cylinder increases the abrasion resistance between the surface of the cylinder and the molding material, preventing idle rotation of the molding material on the cylinder, and permits the production of high extrusion pressure.

(2) The compression ratio of the screw is adjusted to from 1.0 to 2.0. When the compression ratio is less than 1.0, the molding material is not sufficiently compressed and, therefore, poorly melted. On the other hand, if the compression ratio is more than 2.0, the smooth transportation of the granular solid molding material in the screw groove becomes difficult. This increases excessively the torque necessary for the rotation of the screw, and sometimes causes the breakdown of devices such as the screw.

(3) In some cases, there is employed a cylinder provided with grooves as in (1) above, which is tapered, i.e., is designed so that the inner diameter of the cylinder is largest at a point below the hopper and reaches a value which is considered a true diameter D at a distance of 4D to 6D (4 to 6 times the inner diameter D of the cylinder) from the point below the hopper.

The application of the above-described means (1) to (3) provides for the production of high extrusion pressure in the solid transportation zone. The metering zone, therefore, acts to melt the molding material and to send the molten molding material into the die. This permits great shortening of the length of the metering zone, and thus a reduction in the residence time. The use of extruders having the above-described structure also allows for addition of large amounts of fillers, additives, etc., for example, in the case of graphite, in an amount of up to 60% by weight.

The molding material thus transferred under high pressure is melted in the front zone of the extruder and extruded from the die. In the die for use in the process of the invention, an introduction part and a land part are thermally separated by a thermally insulating plate, and the temperature in the introduction part is maintained at a temperature higher than the softening temperature of the polyamidoimide resin, whereas the temperature in the land part is maintained at a temperature lower than the softening temperature thereof. Thus, the molding material is shaped under a high pressure of 300 kg/cm² or more and then solidified in the die, and the thus-solidified molded article is extruded from the die. In this case, it is preferred that the solidified article is maintained at a pressure of 300 kg/cm² or more until the temperature thereof reaches less than 230° C.

Solidification of the molding material in the die permits maintaining the pressure in the metering zone at high levels, and the obtainment of molded articles having a high density and a smooth surface.

For example, when a polyamidoimide resin represented by the formula

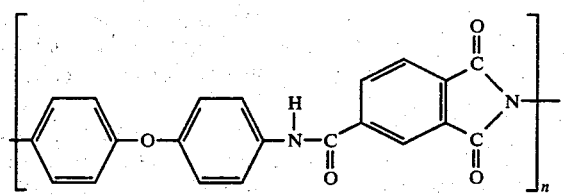

wherein n is from 5 to 200, is used, it is preferred that the temperature of the introduction part into which the molten resin is introduced from the extruder is maintained at 270° to 400° C., and the temperature of the land part is maintained at 250° C. or less.

The cross section of the land part of the die is designed according to the shape of the ultimate molded article. The ultimate molded article may be in any of bar, pipe, and different cross-sectional forms, etc., and can be produced by the use of the corresponding die. The molded article thus-shaped and solidified in the die is extruded therefrom continuously.

Figure 2:
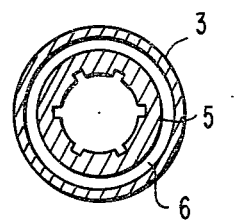
FIG. 2 is a cross-sectional view, taken along the line A—A of FIG. 1, showing only a cylinder of the apparatus.

Hereinafter the invention will be explained in detail with reference to the accompanying drawings, wherein FIG. 1 is a schematic vertical-sectional view of an extruder for use in the practice of the process of the invention, and FIG. 2 is a cross-sectional view, taken along the line A—A of FIG. 1, showing only the cylinder of the extruder.

Referring to FIG. 1, a molding material is fed from a hopper 1 into a cylinder 3 accommodating therein a screw 2. The hopper 1 is equipped with a vibrator 4 to prevent the bridging of the molding material. The cylinder 3 is designed so that it is tapered from a point below the hopper 1 to a point at a distance of 4D to 6D from the point below the hopper 1, and the tapered surface was provided with a plurality of grooves. Furthermore, at the tapered zone, a water-cooled jacket 6 is provided to prevent the over heating of the molding material.

The molding material is heated successively with heaters 7 at temperatures between the melting point and the decomposition temperature of the polyamidoimide resin while being forced toward the top or front of the cylinder 3. Subsequently, the molten molding material is introduced through an adapter 10 into a die 11.

Figure 3:
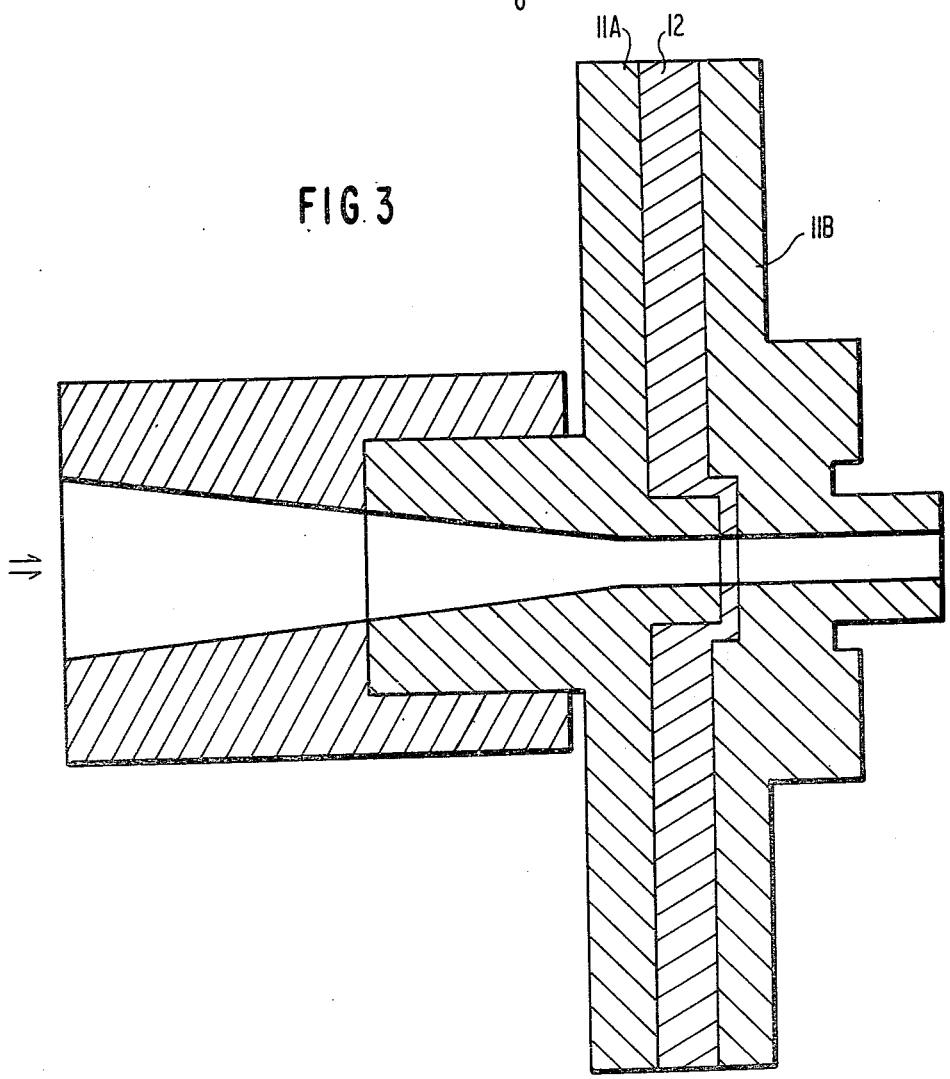
FIG. 3 is an enlarged schematic vertical-sectional side view of a die for use in the practice of the process of the invention.

As illustrated in FIG. 3 showing an enlarged schematic vertical-sectional view of a die for use in the process of the invention, an introduction part 11A and a land part 11B are separated thermally from each other by a thermally insulating plate 12.

The following examples are given to illustrate the invention in greater detail, although the invention is not limited thereto.

EXAMPLES 1 TO 6

A screw type extruder (bore: 45 mm φ (diameter); L/D: 15/1; compression ratio: 1.3) with a die for the molding of 8 mm rod (length of land part: 130 mm) provided at the top thereof was employed as a molding apparatus.

A polyamidoimide resin having the repeating unit represented by the formula

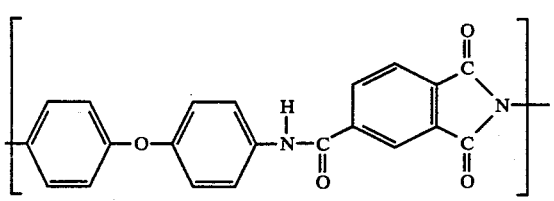

(sold under the trade name of Tolon 4203L or 4301 by Amodo Corp., U.S.A.) was mixed with the additives shown in Table 1 to prepare the corresponding molding materials. These molding materials were molded into rods under the molding conditions shown in Table 1.

The cylinder of the extruder was tapered at a rate of 10/1,000 over a length of 5D from below the hopper, and provided with six grooves (width: 6 mm; maximum depth: 4 mm) as shown in FIG. 2. The outer surface of the cylinder was provided with a water-cooled jacket.

The above-prepared molding material was loaded into the hopper, and a molded article was extruded with rotation of screw of 1 rpm. The cylinder temperature of the extruder was 330° C.

In any of Examples 1 to 6, the continuous extrusion molding could be performed greatly smoothly, and the rods obtained thereby had a smooth and lustrous surface.

TABLE 1

| Example | Molding Material Resin | Molding Material Additive | Cylinder Inner Pressure (kg/cm$^2$) | Temperature of Introduction Part (°C.) | Temperature of Land Part (°C.) |
|---|---|---|---|---|---|
| 1 | Tolon 4203L | Titanium dioxide 3 wt % | 450 | 310 | 180 |
| 2 | " | Teflon powder 0.5 wt % | 750 | 305 | 140 |
| 3 | Tolon 4301 | Graphite powder 12 wt % | 500 | 317 | 188 |
| 4 | " | Teflon powder 3 wt % | 1,180 | 290 | 148 |
| 5* | Tolon 4275 | Graphite powder 20 wt % and teflon powder 3 wt % | 450 | 285 | 110 |
| 6* | Tolon | Graphite powder 40 wt % and teflon powder 3 wt % | 500 | 280 | 109 |

*A die for the production of 15 mm rod (length of land part: 180 mm) was used.

EXAMPLES 7 TO 9 AND COMPARATIVE EXAMPLE 1

Continuous extrusion molding was performed in the same manner as in Examples 1 to 6, except that Tolon 4203L alone was used as a molding material, and the cylinder inner pressure was adjusted to the values shown in Table 2. The density of the rod thus-produced was measured, and the results are shown in Table 2.

TABLE 2

| Example | Molding Material | Cylinder Inner Pressure (kg/cm$^2$) | Density (g/ml) |
|---|---|---|---|
| 7 | Tolon 4203L | 500 | 1.402 |
| 8 | " | 430 | 1.401 |
| 9 | " | 380 | 1.400 |
| Comparative Example 1 | " | 250 | 1.393* |

*Many air bubbles were contained therein.

As apparent from the results shown in Table 2, when the cylinder inner pressure is less than 300 kg/cm$^2$ (Comparative Example 1), the density of the molded article is low. Furthermore, the surface of the molded article obtained in Comparative Example 1 did not have smooth luster, and surface roughening was observed.

While the invention has been described in detail and with reference to specific embodiments thereof, it will be apparent to one skilled in the art that various changes and modifications can be made therein without departing from the spirit and scope thereof.

What is claimed is:

1. A process for extrusion molding a polyamidoimide resin comprising:
   (1) feeding a polyamidoimide molding material in a granular solid or powder form into an extruder;
   (2) compressing the polyamidoimide molding material under a pressure of about 300 kg/cm$^2$ or more in the extruder and simultaneously melting the material by heating it to a temperature between the melting point and the decomposition temperature of the polyamidoimide resin; and
   (3) introducing the molten polyamidoimide molding material maintained at the same temperature and pressure as in (2) into a die, and extruding therefrom such that the molten material is shaped to a desired form and solidified in the die, and is extruded from the die in solidified form.

2. A process as in claim 1, wherein a major proportion of the polyamidoimide resin comprises a repeating structural unit represented by the formula

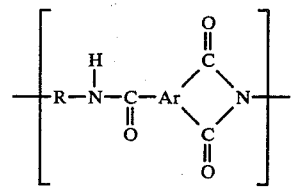

wherein Ar is a trivalent aromatic group containing therein at least one benzene nucleus, and R is a divalent organic group.

3. A process as in claim 2, wherein a major proportion of the polyamidoimide resin comprises a repeating structural unit represented by the formula

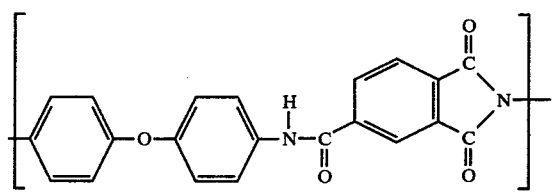

4. A process as in claim 1, 2, or 3, wherein the pressure in (2) is from 400 to 1,200 kg/cm$^2$.

* * * * *